C. E. SACKETT.
AGRICULTURAL IMPLEMENT.
APPLICATION FILED JAN. 19, 1916.

1,211,241.

Patented Jan. 2, 1917.
6 SHEETS—SHEET 1.

WITNESSES:
H. W. Sackett
W. R. Smith

INVENTOR.
Chas. E. Sackett,

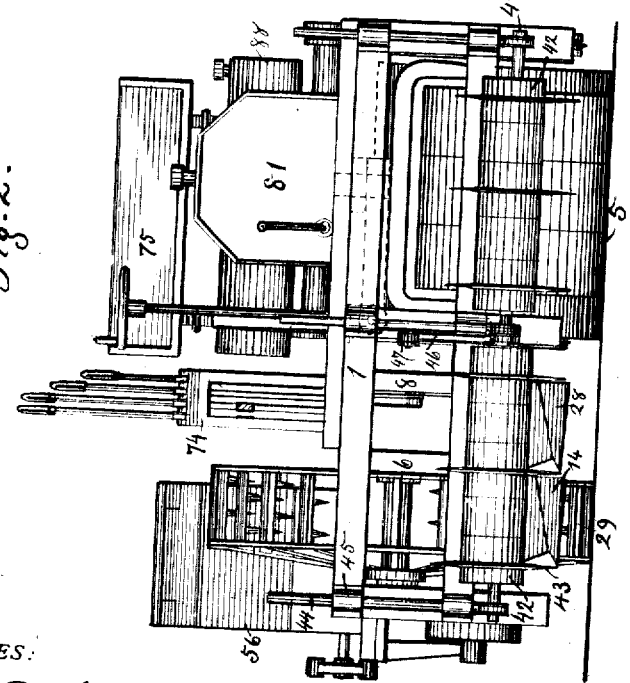

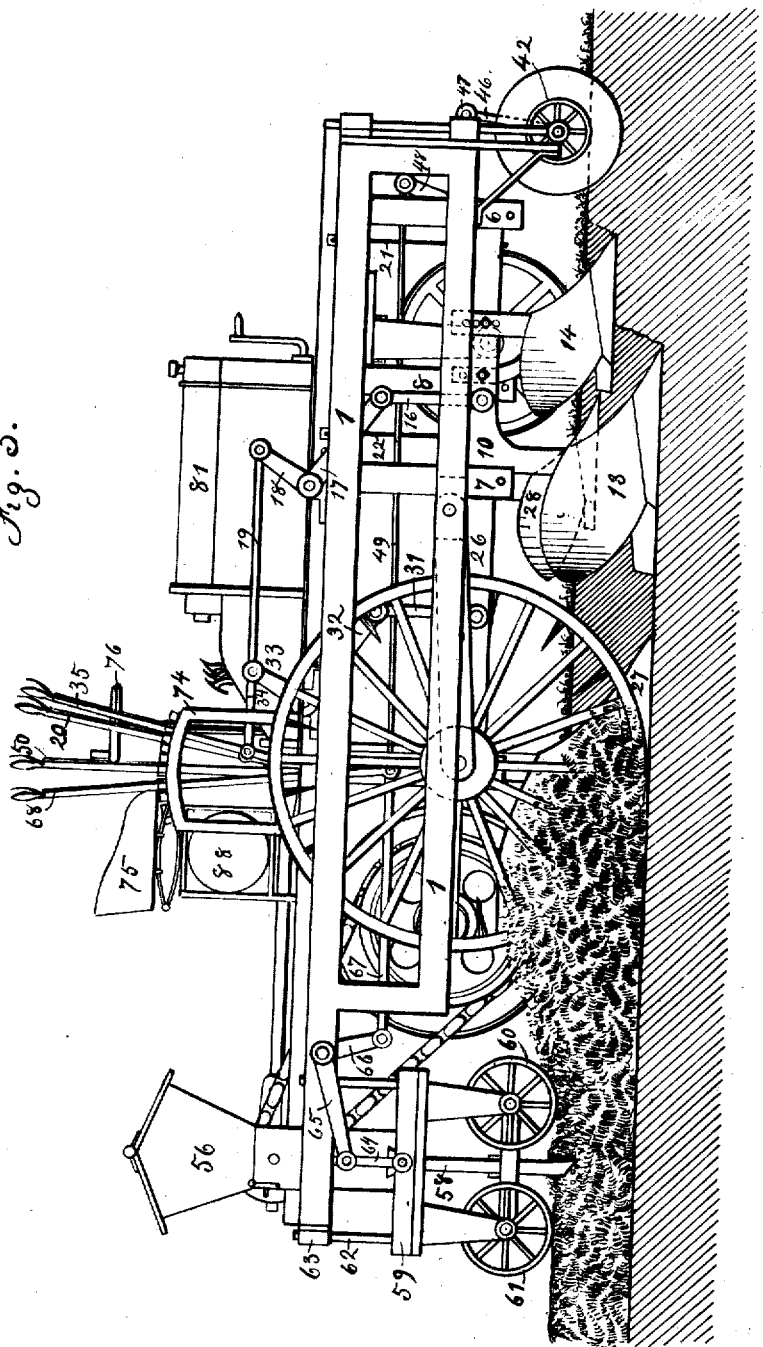

C. E. SACKETT.
AGRICULTURAL IMPLEMENT.
APPLICATION FILED JAN. 19, 1916.
1,211,241.
Patented Jan. 2, 1917.
6 SHEETS—SHEET 4.
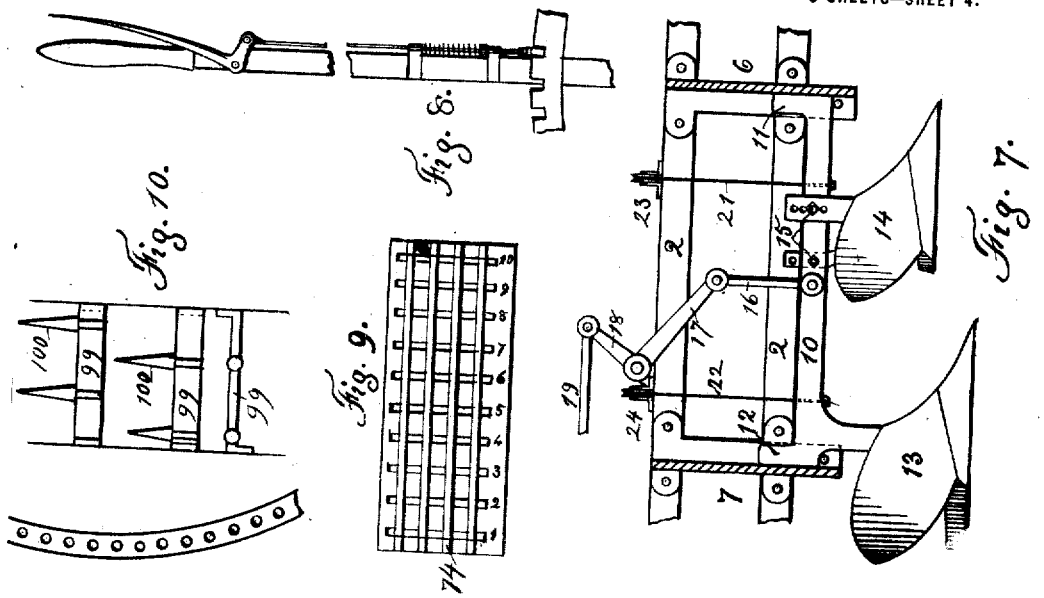
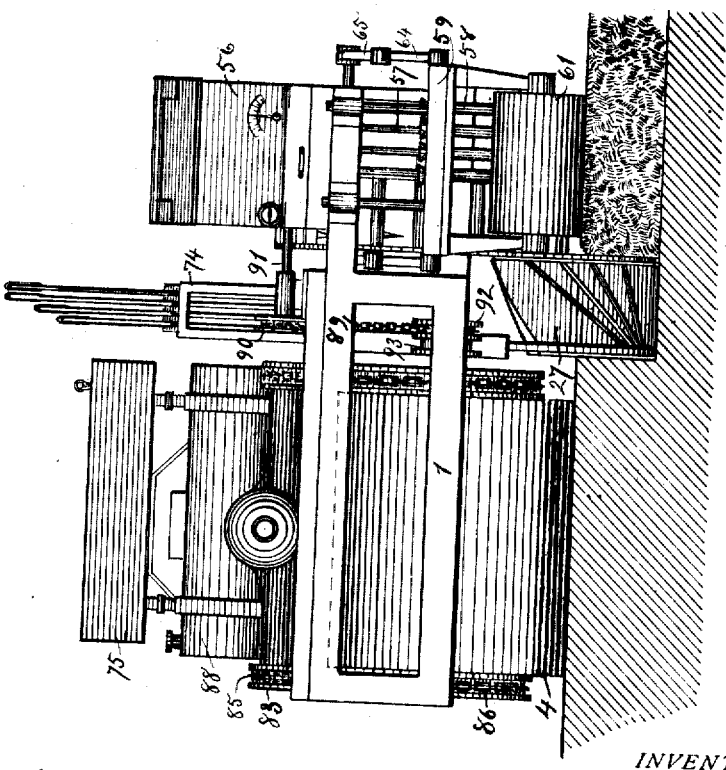
WITNESSES:
H. W. Sackett
W. R. Smith.
INVENTOR.
Chas. E. Sackett,

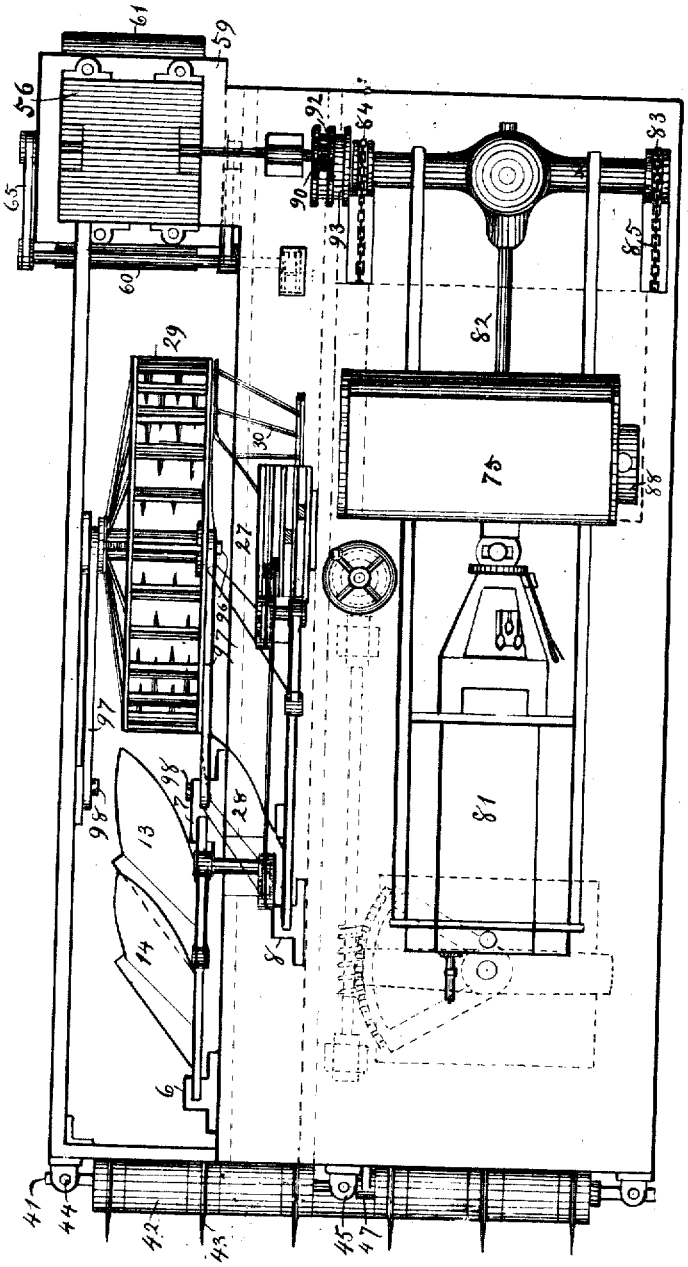

C. E. SACKETT.
AGRICULTURAL IMPLEMENT.
APPLICATION FILED JAN. 19, 1916.

1,211,241.

Patented Jan. 2, 1917.
6 SHEETS—SHEET 6.

WITNESSES:
H. W. Sackett
W. R. Smith

INVENTOR.
Chas. E. Sackett

UNITED STATES PATENT OFFICE.

CHARLES E. SACKETT, OF DANBURY, CONNECTICUT.

AGRICULTURAL IMPLEMENT.

1,211,241.  Specification of Letters Patent.  Patented Jan. 2, 1917.

Application filed January 19, 1916. Serial No. 72,966.

*To all whom it may concern:*

Be it known that I, CHARLES E. SACKETT, a citizen of the United States, residing at Danbury, in the county of Fairfield and State of Connecticut, have invented a new and useful Improvement in Agricultural Implements, of which the following is a specification.

My invention relates especially to such agricultural implements as are intended to plow, pulverize, fertilize, and seed the land in one passage over it, and has for its object, to provide a fully prepared seed-bed in one operation, and to avoid the trampling or packing of the seed-bed in whole or in part.

Figure 1:
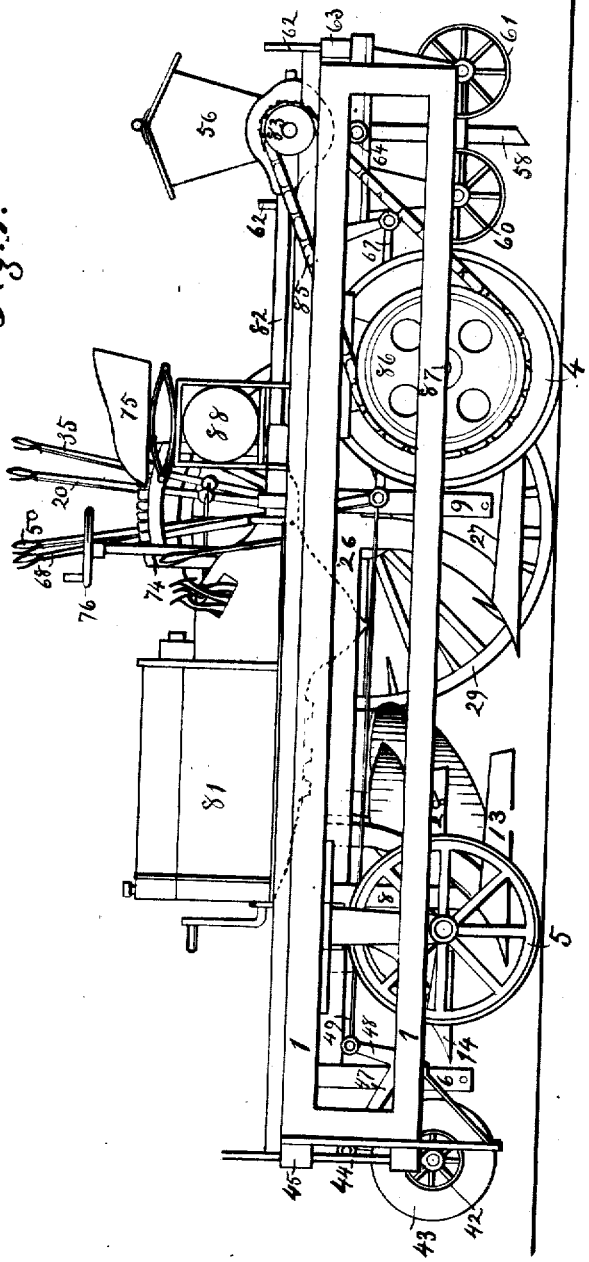
Figure 12:
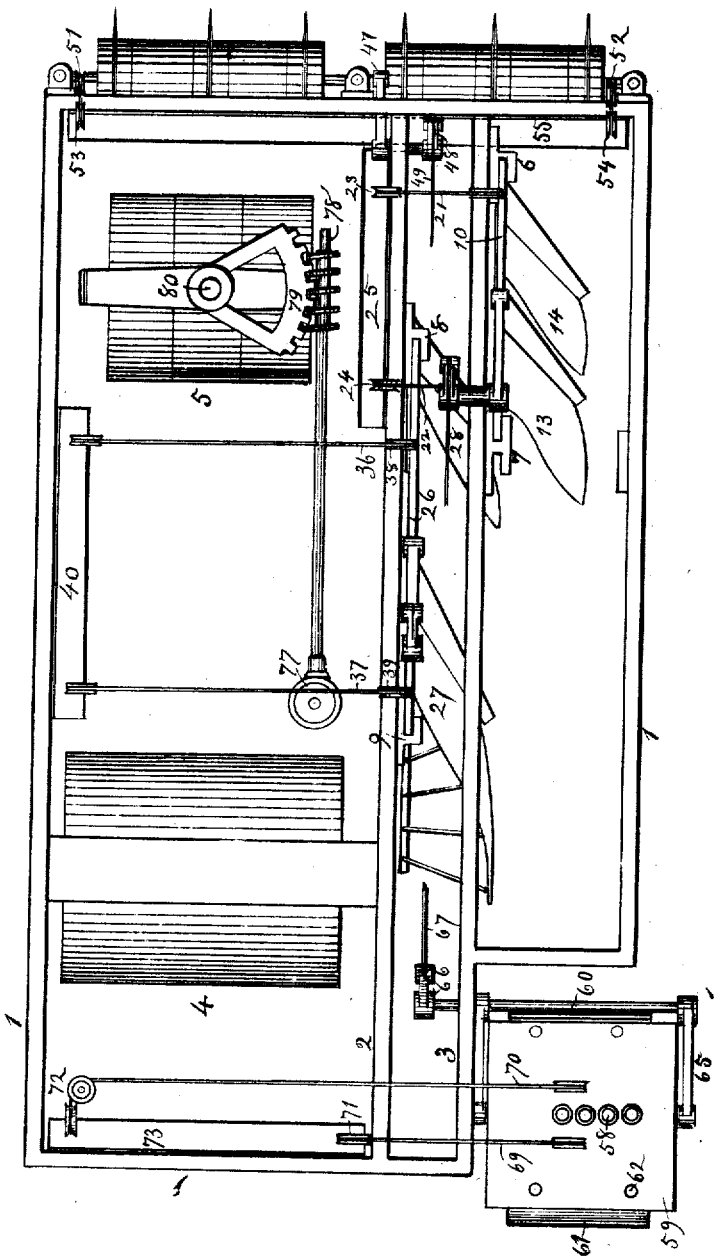

*Drawings.*—Figure 1 represents an outside elevation on the land-side of the implement, all operative parts but the traction system being raised for transportation; Fig. 2 is a front view of the same; Fig. 3 is a rear view after opening the first furrow, the seeding apparatus being removed to show the relative position of the pulverizing wheel and sub-soil plow as it turns the soil into the wheel; the land is shown in section; Fig. 4 is a detail view of the fertilizing receptacle mounted on the frame directly over the pulverizing wheel when in use; Fig. 5 is a complete outside elevation of the furrow side of the implement, all operative parts at work; the land is shown in section; Fig. 6 is a rear view of the same, the land passed over being plowed, pulverized, seeded and rolled in the one passage of the implement; Fig. 7 is a detail view of the plow beam inclosed in its guides, which are cut open in section. This view shows the method of lowering, raising and locking the plows by levers; and the wire cables by which their weight is balanced; Fig. 8 is a detail of a hand lever with a segment of rack showing locking notches; Fig. 9 is a detail of complete rack for four hand levers with numbered notches showing position of operative parts; Fig. 10 is a detail of the pulverizing wheel cross bars, showing internal pulverizing teeth and section of wheel rim showing adjustability of bar spacing; Fig. 11 is a plan view of the working platform of the implement; Fig. 12 is a plan view just below the working platform, showing method of steering, and the balancing of all operative parts by wire cables passing over pulleys to balance weights on the traction side of the implement.

The invention more particularly consists in improvements on the art comprising the following United States patents which were issued to me: No. 220,176 and No. 220,177 both dated September 30, 1879; No. 222,603 dated December 16, 1879; No. 233,809 dated October 26, 1880; No. 238,970 dated March 15, 1881; No. 268,830 dated December 12, 1882; No. 279,818 and No. 279,819 both dated June 19, 1883.

1 is a rectangular frame constructed preferably of upper and lower steel channel beams and uprights, suitably riveted together to form a stiff frame, adapted to be propelled by traction power. (See Figs. 1 and 12). The frame is divided longitudinally by upper and lower beams 2, into a land tractional section, and an overhanging furrow section, which is divided also longitudinally by upper and lower beams 3, which assist in the support and operation of various members pertaining to that section.

The land section of the frame, is supported rearwardly on a traction roller 4, and forwardly on a pivotal steering roller 5. The frame is made stiff enough and wide enough for these traction rollers to also support the overhanging furrow section of the frame and to carry its weight as added traction force.

Securely bolted to the upper and lower longitudinal beams 3, and depending vertically below them, are two plow beam guides 6 and 7, (see Figs. 5 and 12, also detail Fig. 7), in which the guides 6 and 7 are shown in vertical section cut open to disclose the inclosed plow beam 10, with upturned ends 11, 12, which slide vertically within the guides and prevent any tendency of the beam to get out of longitudinal level; while the sides of the guides hold the beam firmly against any tendency to get out of lateral or horizontal level. In hand plowing, these tendencies have to be overcome by constant muscular strain upon the plow handles. To plow beam 10 is secured a plow 13, its office is to open a first furrow in advance of a pulverizing wheel which rolls in the bed of the furrow made by this plow. In all of my previous inventions as above recited, the absence of this plow, or its immobility, was a fatal defect.

In the three figures above referred to, a second adjustable plow 14 is shown also attached to plow beam 10, in advance of plow 13; its use is only to divide the cut of land horizontally in opening first furrows in heavy land; its use is optional according to the nature of the land.

Plow beam 10, and its attached plows, are raised or lowered in the vertical guides by means (see detail Fig. 7) of a vertical bar 16, one end of which is pivoted in the plow beam, its other end is attached to the right angle crank levers 17, 18, pivoted in the frame of the implement, and operated by a connecting rod 19, pivoted to one end of the levers, and terminating at its other end in a hand lever 20, (see Fig. 5) secured in the operating rack of the implement. Plow beam 10, and its attached plows, are also raised by means of the wire cables 21, 22, passing over pulleys 23, 24, attached to the frame, and terminating in balance weight 25, on the traction side of the implement. (See Fig. 12). This method leaves nothing but a little friction to overcome in handling the plows.

The plows being chisel pointed a little pressure on the hand lever enters them in the land to the depth of furrow desired, while the operating rack system holds them in position until released; a stop bolt at the lower extremity of the guides prevents lowering the plows too far.

It will be observed, that the guide members besides holding the plows in operative rigidity exert the full thrust of the power propelled frame upon the rear end of the plow beam in plowing; and also on the front-end, in withdrawing the plows from the land, to make turns, or reverse the action for any cause.

Securely bolted to upper and lower longitudinal beams 2, and depending from it, are a similar pair of plow beam guides 8, and 9, which inclose a plow beam 26, to which is attached a sub-soil plow 27. To the same beam in advance of this plow is adjustably secured a skim plow 28; plow beam 26, and its attached plows are inclosed and operated in its guides (see Fig. 12) in the same manner as shown in detail Fig. 7. The sub-soil plow is located beside the open side of a pulverizing wheel 29. (See Fig. 3.) This wheel is located in an adjoining furrow previously opened by plow 13, as heretofore described. The share of the sub-soil plow meets the pulverizing wheel centrally; its moldboard conforms to the periphery of the wheel rearwardly; and is substantially braced from the plow landside by braces 30, to confine the soil turned into the wheel until it is pulverized, and discharged rearwardly from the wheel to fill the open furrow behind it. The office of the skim plow in advance of the sub-soil plow, is to skim a thin cut of sod, weeds, or stubble and turn it into the open furrow before the pulverizing wheel, to be rolled by it into the bed of the furrow; leaving only cleared soil to be turned into the pulverizing wheel by the subsoil plow; which soil is discharged rearwardly through the openings in the wheel upon the weeds rolled down by it; thus burying them the full depth of the furrow below a covering of finely pulverized soil which is making the best use of them as fertilizers.

Plow beam 26, with its plows is operated by vertical bar 31, crank levers 32, 33 (see Fig. 5) and connecting rod 34, terminating in hand lever 35. Its weight is balanced (see Fig. 12) by wire cables 36, 37, passing over pulleys 38, 39, attached to the implement frame, and terminating in balance weight 40, on the traction side of the implement.

The office of pilot plow 13, after opening the first furrow, is to travel thereafter in the open furrow left by the sub-soil plow, and keep it clear of any earth that may roll back into it in advance of the pulverizing wheel. It is therefore termed a furrow clearing plow; while the sub-soil plow is the essential furrow turning plow; and the skim plow, a surface clearing plow. These plows are so designated in the claims. The combined use of these three plows and the pulverizing wheel is essential to the plowing and pulverizing of a single furrow.

In front of the frame of the implement is carried a shaft 41, (see Figs. 2, 5, and 11), on which is mounted a series of rollers 42, to roll down weeds or stubble; between the rollers at predetermined furrow widths, is secured to the side of the rollers, a series of disk cutters 43, whose office is to slice the sod or soil into furrow widths in the manner usual to plow colters; making easier the opening of the furrows. In this implement the office of the series of cutters, besides dividing the land into furrow widths, is to cut weeds or stubble into short lengths to be turned by the skim plow under the pulverizing wheel. They have an additional use being sunk deeply into the land of acting as anchors, to prevent the drag of the plow (being all on one side of the implement) from deflecting it from a straight line furrow, which is desirable. This tendency to deflection, may also be overcome by setting the steering roller a degree or two against the drag of the plows. The rollers, cutters, and the shaft on which they are mounted, are lowered or raised by means of guide posts 44, in which the shaft is journaled; and which slide vertically in boxes 45, attached to the frame of the implement; they are operated by bar 46, crank levers 47, 48, and connecting rod 49, terminating in hand lever 50. The weight of the roller mechanism is also balanced by wire cables 51, 52, passing over pulleys 53, 54, attached to the frame of the implement, and terminating in weight 55, on the inside of the traction section.

On the working platform of the implement is located an operator's seat 75, (see Fig. 5) in front of which is a steering wheel 76, which operates by means of suitably geared connections 77, and worm shaft 78, (see Fig. 12) the worm quadrant 79, which is made fast to the pivot 80, of the steering roller. On 'his platform also, is suitably laid down (see Fig. 11) the internal combustion motor 81; whose driving shaft 82, operates at right angles the sprocket chain wheels 83, 84, and sprocket chains 85, to drive the sprocket wheels 86, (see Fig. 1) made fast to the axle 87, of the traction roller.

A tank 88, for liquid fuel is secured under the operator's seat. In close proximity is a segmental operating rack 74, (see Figs. 1 and 5) in which the operating levers slide; the surface of this rack has numbered notches showing at what depth of soil the plows are working (see detail Fig. 9).

The pulverizing wheel is located in the implement as prominently shown in several of the figures; its constructive details having been described in previous applications, only its improvements are described herein. To each end of its axle 96, are pivoted substantial swing bars 97; the other extremity of the bars is pivoted in the frame of the implement at 98, (see Fig. 11), thus giving the pulverizing wheel an independent automatic vertical movement, and a positive longitudinal propulsion coincident with the movement of the frame of the implement in either direction. The wheel cross bars 99, are provided with internally projecting teeth 100, preferably of steel castings with the bars. The bars are spaced in the rims of the wheel so that the teeth alternate, as shown in Fig. 10. The rims are provided with a series of bolt holes as shown, so that the cross bars may be spaced to suit any degree of pulverization. As the teeth always are below the soil being turned in upon them by the plow, the rolling action of the wheel constitutes a continual forking of the soil which makes field tillage by this process analogous to hand forked garden soil.

Having thus described my invention what I claim as new and desire to secure by Letters Patent is:

1. An implement as characterized comprising a power-propelled frame; a furrow-turning plow operatively connected with and laterally extended from the land side of said frame; a furrow-clearing member operatively connected with said frame in advance of the working position of and at the side of said furrow-turning plow for clearing a previously formed furrow; an earth-pulverizing apparatus propelled by said frame in the following path of said furrow-clearing member and at the side of said furrow-turning plow for receiving the earth turned by said furrow-turning plow; a surface-clearing plow disposed in service in advance of said furrow-turning plow for delivering the surface growth in the rear of said furrow-clearing member and in the path of said pulverizing apparatus, whereby said surface growth is disposed below the bed prepared by said earth-pulverizing apparatus, said furrow-turning, furrow-clearing, and surface-clearing plows being disposed below the overhanging section of said power-propelled frame, and having independent vertical movements, relative to said frame and to each other, said earth-pulverizing apparatus having an automatic voluntary vertical movement relative to said frame, the earth discharged from said earth-pulverizing apparatus refilling the furrow behind it above said surface growth; and means following said earth-pulverizing apparatus to level the pulverized earth deposited in said furrow behind said pulverizing apparatus, thus preparing said furrow for immediate seeding.

2. In an implement as characterized, the combination of means for working a plurality of furrows, one of said furrows being previously formed; means for receiving the earth from the furrow being turned, and pulverizing said earth; means for delivering the surface growth of the land being prepared onto the bottom of the cleared previously formed furrow; means for refilling the previously formed furrow with pulverized earth and for forming and finishing a bed for immediate seeding; means for operatively connecting said above-mentioned means, said connecting means embodying a power-propelled frame divided longitudinally into land and furrow-sections, said furrow section overhanging the furrows to be worked, said furrow section being supported laterally by the land section of said frame; and means mounted on said frame for placing each of said means into active or inactive position and for operating the same.

In testimony whereof, I, CHARLES E. SACKETT have signed my name to this specification in the presence of two subscribing witnesses, this seventeenth day of January, 1916.

CHARLES E. SACKETT.

Witnesses:
S. E. STEVEN,
B. A. WORDEMANN.